Aug. 28, 1923. 1,466,446
A. P. BRUSH
CRANK SHAFT AND METHOD OF BALANCING THE SAME
Filed March 26, 1921
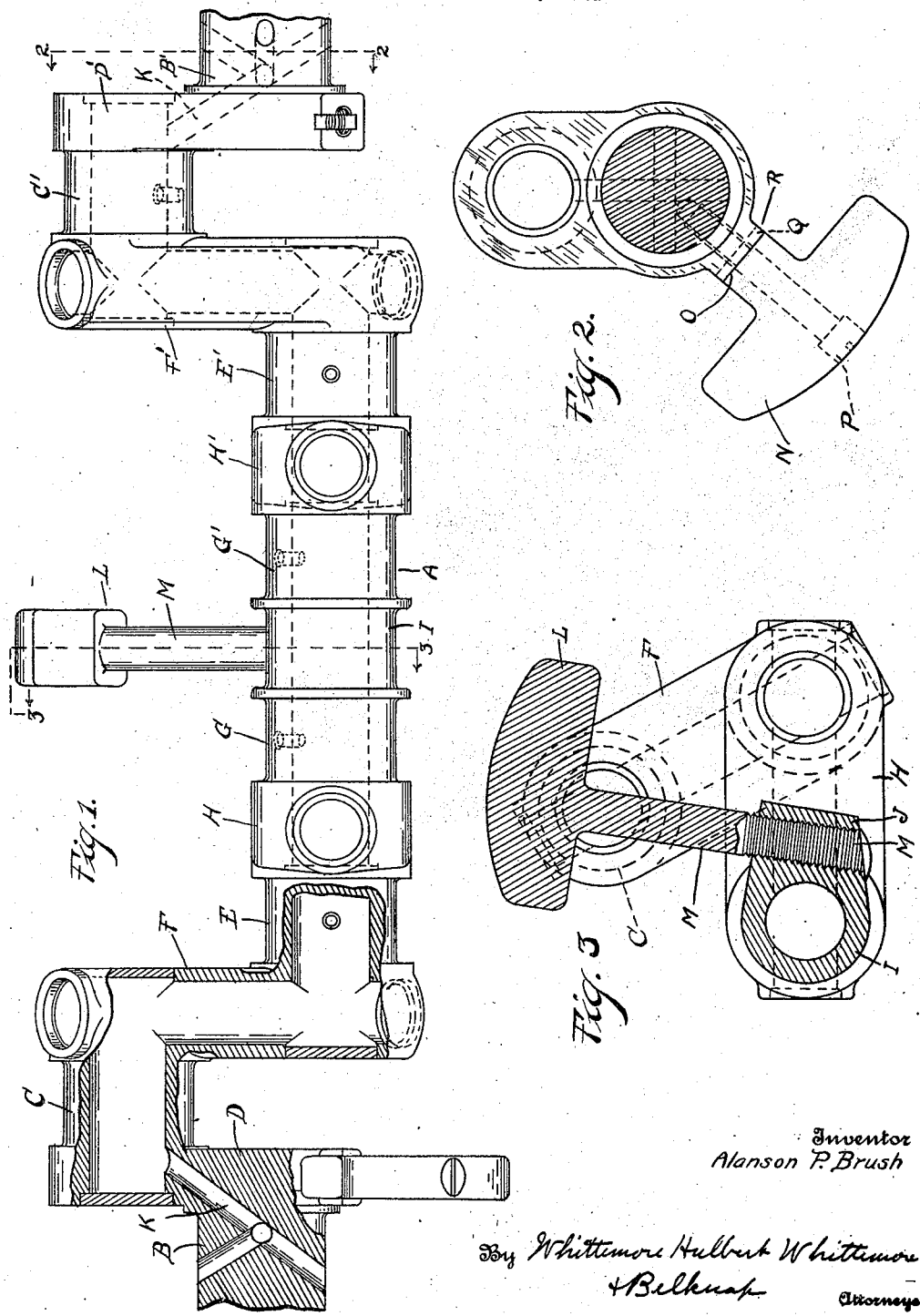
Inventor
Alanson P. Brush
By Whittemore Hulbert Whittemore
+Belknap
Attorneys Patented Aug. 28, 1923.

1,466,446

UNITED STATES PATENT OFFICE.

ALANSON P. BRUSH, OF DETROIT, MICHIGAN.

CRANK SHAFT AND METHOD OF BALANCING THE SAME.

Application filed March 26, 1921. Serial No. 455,724.

*To all whom it may concern:*

Be it known that I, ALANSON P. BRUSH, a citizen of the United States of America, residing at Detroit, in the county of Wayne and State of Michigan, have invented certain new and useful Improvements in Crank Shafts and Methods of Balancing the Same, of which the following is a specification, reference being had therein to the accompanying drawings.

The invention relates to crank shafts for multi-cylinder engines which are provided with more than four aligned cylinders, and it is the object of the invention to obtain a construction which may be used with a single pair of shaft bearings, or, in other words, dispensing with all bearings intermediate the ends of the shafts. In the present state of the art it is not considered practical to build crank shafts of more than four throws without one or more intermediate bearings. This is for the reason that the bending moment on the shaft is increased with the added number of throws, requiring an enlargement of the shaft to stiffen the same, while this enlargement of the shaft increases the friction on the crank pin bearings, and consequently, the heating effect and danger of burning out said bearings.

With my improved construction the shaft is properly stiffened by enlargement of the diameter thereof and to avoid increasing the heat, a cooling medium is passed continuously through the shaft to lower the temperature of the bearings. I have also provided a construction which is accurate in dynamic and static balance, so that only end bearings are necessary and the length of the structure can be condensed by the omission of all intermediate bearings.

In the drawings:

Figure 1 is a sectional side elevation of the crank shaft;

Figure 2 is a cross-section upon line 2—2 of Fig. 1;

Figure 3 is a cross-section on line 3—3 of Fig. 1.

A is the crank shaft having the end journal portions B and B′ and intermediate the same a plurality of crank throws for more than four aligned cylinders. As specifically shown, there are six throws arranged in three different radial planes. These include the crank pins C and C′, which are adjacent to the end bearings and are connected with the portions B of the shaft by the portions D and D′ extending in the same radial plane.

The pins C and C′ are connected with pins E and E′ in a different radial plane by the obliquely extending portions F and F′. The pins E and E′ are connected with the pins G and G′ in the third radial plane by obliquely-extending portions H and H′ and between the pins G and G′ is a portion I having a projecting lug J for the attachment of a center counterbalancing weight. All of the pins and all of the crank throws are hollow, communicating with each other, and are connected at the opposite ends of the shaft with channels K leading to the journals B and B′ for the main bearings, the arrangement being such that lubricant can be fed through the entire shaft in sufficient volume and at sufficient speed to absorb the heat from the pins due to the friction of the bearings thereon.

To balance the shaft a center counterbalancing weight L is secured to the lug J by means of a shank M threaded at its ends and engaging a correspondingly threaded aperture in the lug J. This threaded engagement permits of lengthening or shortening the shank M in its relation to the lug J by revolving the counter weight, which facilitates the operation of obtaining a rough balance. A more accurate balance may then be obtained by adding or subtracting weight from the member L. The opposite ends of the shaft are also provided with counterbalancing weights which function in cooperation with the center counterbalance to bring the shaft as a whole in balance about the axis of the main bearings. These last-mentioned counterweights N are secured to bearing faces O on the throws D and D′. The weights N are, as shown, secured by center bolts P and are additionally held from displacement by tongues Q which engage grooves R in the faces O.

With the shaft constructed as described the increased rigidity obtained by enlargement in diameter is sufficient to safely take care of increased bending moment due to the elimination of all center bearings, while the increased frictionally developed heat in the enlarged pin bearings is absorbed by the cooling medium circulating through the shaft. Therefore, the single pair of shaft-supporting journal bearings arranged at opposite ends thereof are sufficient and the construction of the motor is simplified and condensed.

What I claim as my invention is:

1. A crank shaft for internal combustion engines, comprising journal bearings at opposite ends only, six intermediate crank pins arranged in substantially axially aligned pairs in three radial planes, and throws directly connecting said pins with each other and said end journal bearings.

2. A crank shaft for internal combustion engines, comprising journal bearings at opposite ends only, six crank pins in axially aligned pairs arranged in three radial planes, and six throws for connecting said pins with each other and said end journal bearings.

3. A crank shaft for internal combustion engines comprising journal bearings at opposite ends only, six intermediate crank pins arranged in substantially axially aligned pairs in three radial planes and throws directly connecting said pins with each other and said journal bearings, said pins being increased in diameter over that required for rigidity with a less number of throws, and means for absorbing the increased heat incident to the enlargement of the pins.

4. A crank shaft for internal combustion engines comprising journal bearings at opposite ends only, six intermediate crank pins arranged in substantially axially aligned pairs in three radial planes and throws directly connecting said pins with each other and said journal bearings, said pins and throws being hollow to form a continuous channel from end to end of the shaft and being enlarged to impart added rigidity over that required for a less number of throws, said channel permitting the passing of a cooling medium through the shaft to absorb the added frictional heat incident to the increased size of the pins.

5. A crank shaft for internal combustion engines comprising journal bearings at opposite ends only, six intermediate crank pins arranged in substantially axially aligned pairs in three radial planes, and throws directly connecting said pins to each other and said journal bearings, said pins and throws being hollow to form a continuous channel from end to end of the shaft for the passage of a cooling medium and being increased in diameter over that required for a less number of throws to secure rigidity, a counterweight at the middle of said shaft, a pair of counterweights at the ends of said shaft, said middle counterweight having its center of gravity lying in one plane passing through the axis of the shaft, and said end counterweights having their centers of gravity lying in another plane passing through the axis of said shaft.

In testimony whereof I affix my signature.

ALANSON P. BRUSH.